United States Patent [19]

Patton

[11] Patent Number: 5,101,286
[45] Date of Patent: Mar. 31, 1992

[54] SCANNING FILM DURING THE FILM PROCESS FOR OUTPUT TO A VIDEO MONITOR

[75] Inventor: David L. Patton, Webster, N.Y.

[73] Assignee: Eastman Kodak Company, Rochester, N.Y.

[21] Appl. No.: 496,730

[22] Filed: Mar. 21, 1990

[51] Int. Cl.⁵ .............................................. H04N 1/04
[52] U.S. Cl. ........................................ 358/487; 358/76
[58] Field of Search ............... 358/487, 76, 80

[56] References Cited

U.S. PATENT DOCUMENTS

| | | | |
|---|---|---|---|
| 3,237,541 | 3/1966 | Gallagher | 95/12 |
| 4,716,470 | 12/1987 | Levine | 358/76 |
| 4,757,334 | 7/1988 | Volent | 354/76 |
| 4,764,807 | 8/1988 | Kimura et al. | 358/76 |

Primary Examiner—Edward L. Coles, Sr.
Attorney, Agent, or Firm—Raymond L. Owens

[57] ABSTRACT

In a photographic film process after a film negative has been bleached, but before being fixed, an image of the negative is electrically captured. This captured image is used to determine if a print should be made.

3 Claims, 2 Drawing Sheets

SCANNING FILM DURING THE FILM PROCESS FOR OUTPUT TO A VIDEO MONITOR

TECHNICAL FIELD

This invention relates to a method and apparatus for capturing a visual image from a film negative for image processing, transmitting and viewing that image on a video monitor, during a photographic film process.

BACKGROUND OF THE INVENTION

The photographic process changes the latent silver halide image into a negative color or negative black and white image in the case of color negative or black and white negative films. In all cases the film passes completely through the photographic process stages, after which it must be dried using a film dryer. The negative is then printed onto photographic paper producing a positive print that can be viewed. A customer waits until the photographic film process is completed and the film is printed using a photographic printer and the photographic paper process is completed before viewing their images. This takes considerable time and delays customers from seeing their images. More particularly, a customer waits until negatives are printed to see the images. It is then and only then the customer can decide whether or not they want the print. The customer receives all the image prints whether or not they are wanted. It is the operator doing the printing or an automatic printer algorithm which decides which prints the customer receives. The customer must then pay for all the prints.

SUMMARY OF THE INVENTION

It is an object of the present invention to overcome the above-described problems.

The above object is achieved in a method of viewing a positive image of a film negative to determine if a print of it should be made, comprising the steps of:

a) developing an image on a film with developer solution;

b) delivering the developed film to a bleach solution;

c) removing the film from the bleach solution after a visible image has been formed;

d) electrically capturing the visual image for viewing;

e) finishing processing of the film to form a negative; and f) selectively making a print of a film negative if its captured visual image is considered acceptable.

In this invention a negative image is captured using a CCD, video tube camera, or similar type device after bleaching. Such image is corrected for color and density. A CRT or similar device displays the image and a customer viewing the image can choose, using an input device such as a keyboard, if it is to be made into a hardcopy print by a printing device such as a photographic printer, thermal printer, or electrostatic printer. This invention permits a customer to see the positive images before a costly print is made. In the case of certain film processes, as soon as the film has been in the bleach for about one-fourth of the required bleaching time and image becomes visible. It is at this time that there is enough visible image formed on the film that the image can be captured, corrected for color and density, and transmitted for output on a CRT, where the customer can view the images.

It is already known in the art how to illuminate a completely processed and dried photographic negative using a light source such as a tungsten halogen lamp, to focus the image of the negative using a lens onto an image capturing device such as a CCD or video tube camera, and to save the image using a frame store or memory. It is also known in the trade how to correct the stored image for density and color so that a positive image representing the printed positive image may be displayed on a CRT. The present invention does not require waiting until the negative is processed and dried, instead the negative is transported through an illuminated stage, and as the film passes through the stage the illuminated film's negative image is projected by means of a lens onto the CCD or video tube camera. The image is electrically captured and transmitted by means of a logic and control unit to a memory device such as a frame store and the captured image is corrected for color and density using an algorithm and displayed on a viewing device such as a CRT. The displayed image is then viewed by the customer who chooses which images are to be printed. The customer viewing the images designates which images are to be printed by inputting their choices through a device such as a keyboard. The logic and control unit then encodes which negative images are to be printed. Customers viewing the images can also indicate in what print size/format (2R, 3R, 4R, 5R, etc.) they would like the images printed while they are choosing which images to print.

BRIEF DESCRIPTION OF THE DRAWINGS

An embodiment of the invention will be described with reference to the drawing, wherein.

DESCRIPTION OF THE PREFERRED EMBODIMENT

Figure 1:
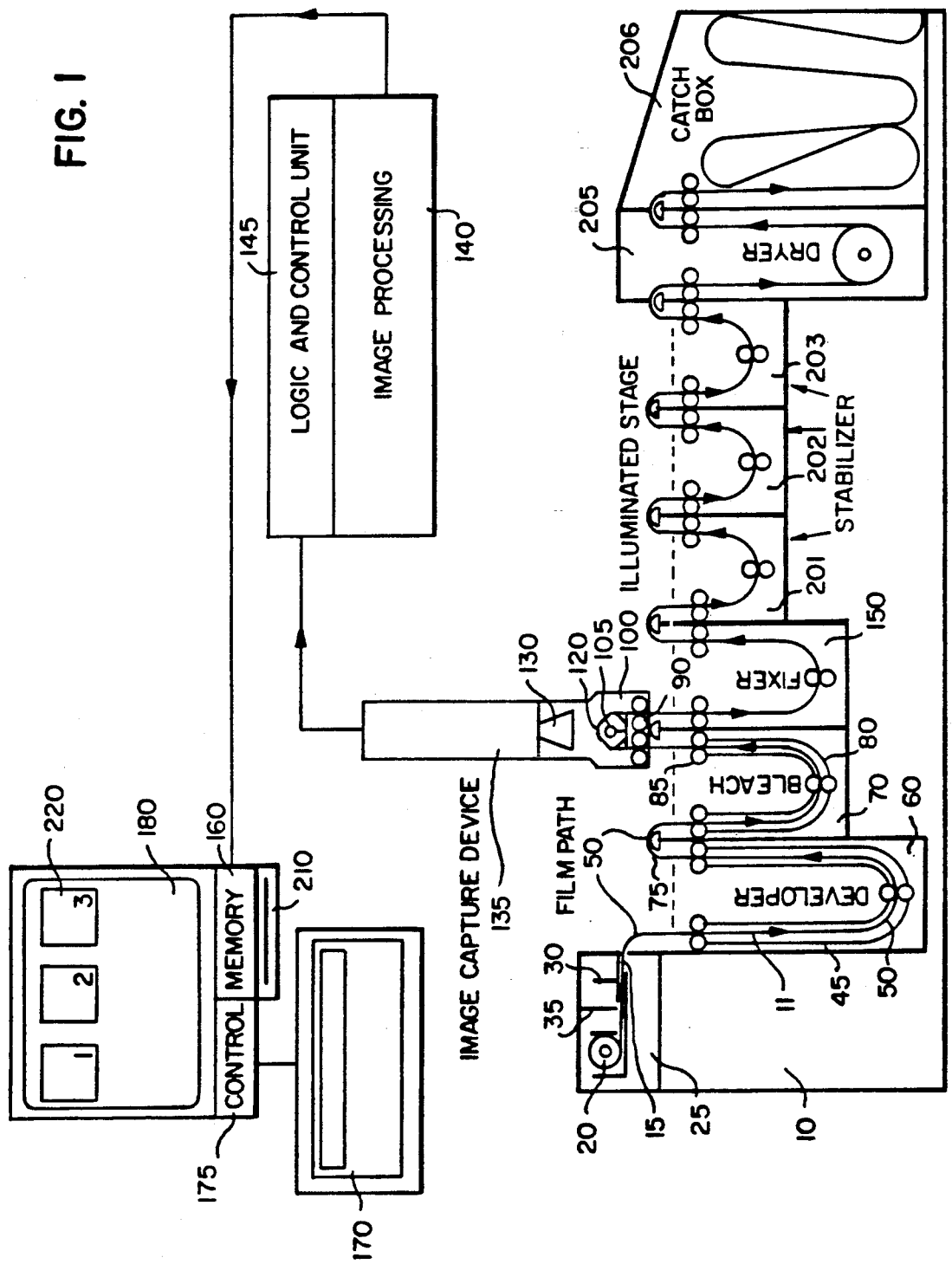
FIG. 1 illustrates a schematic of a preferred embodiment of the invention.

The present invention is adapted to be used in a photographic film processor 10 such as shown in FIG. 1. As shown, a film 15 in a magazine 20 is placed into a film feed device 25 where the film 15 is pulled out of the magazine 20 and cut free of the magazine 20 by a knife mechanism 30, when the film 15 reaches its end and is pulled tight against a sensor 35. The film 15 is pulled through the different steps of the film process in the film processor 10 in a direction shown by arrow 11 by means of a film drive mechanism 40. The film 15 is guided through the processor by film guides 45 which define a film path 50. When the film 15 first enters the film processor 10, the film 15 is guided into and through a developer tank 60 which contains a developer solution. At this position, the film path 50 defined by the film guides 45 keeps the film 15 in the developer solution for the prescribed amount of time. The film 15 then exits the developer tank 60 and travels to a bleach tank 70 which contains a bleach solution by means of a crossover 75. The film 15 is then pulled through the bleach tank 70 by means of a film guide 80 and a drive mechanism 85 where the film path 50 defined by the film guides 80 keeps the film 15 in the bleach solution for the prescribed amount of time. As the film 15 exits the bleach tank 70 by means of a crossover 90, the film 15 is passed through an illuminated stage 100.

Figure 2:
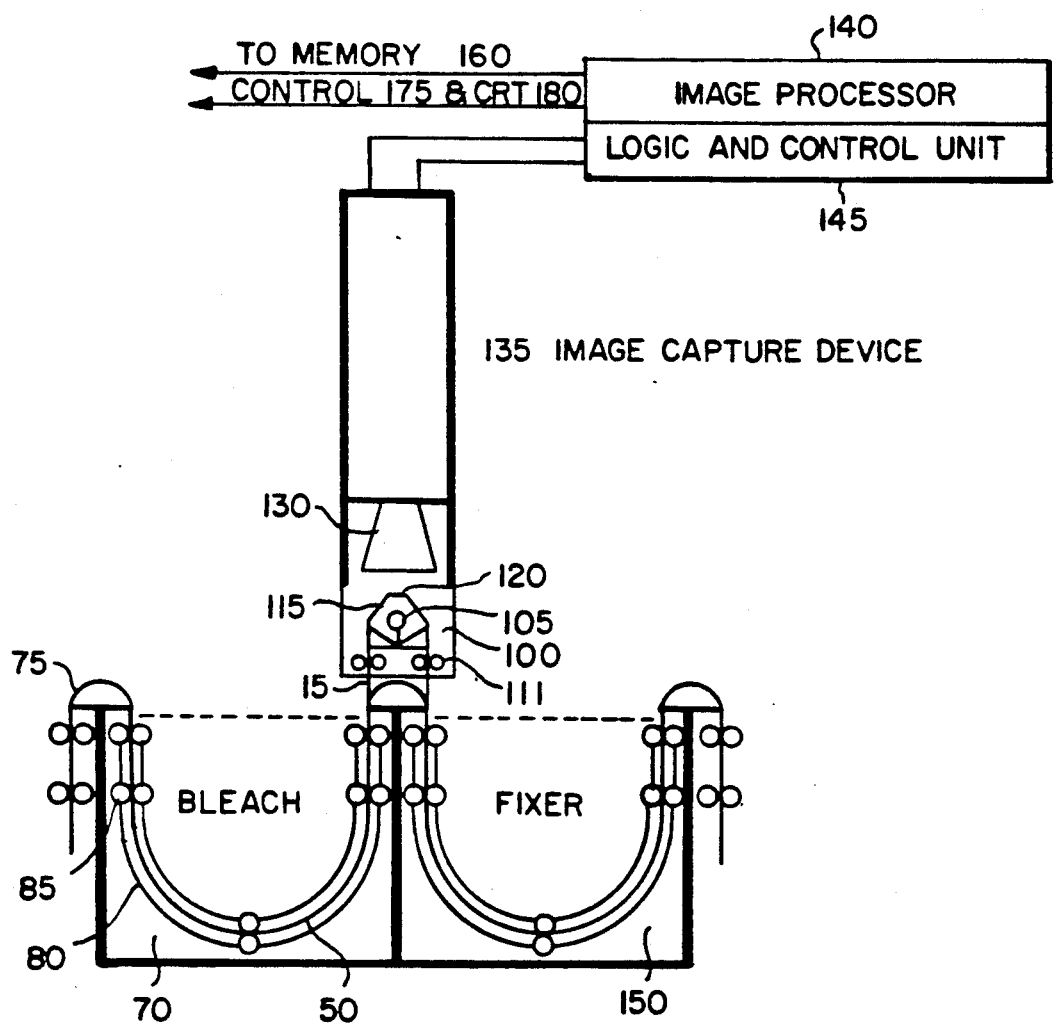
FIG. 2 illustrates an enlarged view of the illuminated stage and the image capturing device of FIG. 1.

Now referring to FIG. 2, the illuminated stage 100 consists of a light source 105, a pair of entry squeegee/drive rollers 110, a curved film track 115, with a slit 120, and a pair of exit drive rollers 111. As the film is driven through the film track 115 by the squeegee drive rollers 110, the film 15 passes over the slit 120. The film is illuminated by the light source 105 and is imaged by a lens assembly 130 onto a CCD or tube type imaging capturing device 135 where an image is recorded and transmitted to an image processor 140. The image capturing, image processing, and image transmission is controlled by a logic and control unit 145. The silm 15 is now driven out of the illuminated stage and into a fixer tank 150 by the second pair of drive rollers 111.

NBow referring again to FIG. 1, the image captured by the CCD imaging device 135 is corrected for density and color and converted to a positve image by the image processing unit 140 and then transmitted to memory 160 where it is stored until an image 220 is called for by a control unit 175 and displayed on an output device such as a CRT 180.

The film continues to be transported by the film drive mechanism 85 through the remainder of the film process which consists of a conventional fixer tank 150, three stabilizer tanks 201, 202 and 203 and then through a dryer 205 and into a catch box 206.

The customer using an input device such as a keyboard 170 selects which of the transmitted images 220 stored in memory 160 and displayed on the CRT 180 the customer would like printed after the film negative has completed being processed and dried. The customer uses the keyboard 170 to designate the images 220 to be printed. The customer's choices are stored in a portable memory 210 where they can be recalled later by the control unit 175 when the film 15 is being printed or can be sent directly to the printer's memory.

As described above, after the bleaching step in the photographic process, the image is developed and captured. However, it has been determined that after at least about one-fourth of the bleach cycle has been completed, an image is developed which can be captured. So instead of being completely bleached and delivered to a fixer station, the film can be delivered to a second processing tank containing bleach solution before being delivered to the fixer tank.

EXAMPLE

Samples of KODAK VRG 100, Gold 100, VRG 400, and VRG 1000 film were processed in a PAKO C-41 HTC Filmachine using a standard KODAK C-41 Film Process. Following the 3'15" development stage of Flexicolor C-41 process the samples were removed from the bleach portion of the process at different times. The normal C-41 bleach step is 6'30" in length. It was found that negatives processed through more than one-eighth of the C-41 bleach time appear similar to negatives processed through the entire bleach cycle. The same experiment was run using KODAK's C-41RA Film Process on a KODAK KMS 50 Film Processor which has a developer time of 3'15" and a bleach time of 45". The results were very similar to those obtained using the C-41 process.

Following removal from the bleach the film was placed into a can containing stabilizer to keep the film wet and brought to a KODAK 312 Printer and printed onto KODAK 2001 Paper. The film samples were then returned to the film processor and placed back into the processor at the stage in the process cycle at which they were removed.

The resulting prints from the interrupted bleach film samples were then compared to prints from samples of similar films that had gone through the ccomplete C-41 and C-41RA processes. The prints from the negatives that went through the interrupted cycle were judged to be very similar to the prints that had gone through the complete cycle. Sensitometry measurements made from the samples also showed the prints were similar.

The invention has been described in detail with particular reference to a certain preferred embodiment thereof, but it will be understood that variations and modifications can be effected within the spirit and scope of the invention.

I claim:

1. A method of viewing a positive image of a film negative to determine if a print of it should be made and for making prints of acceptable images, comprising the steps of:
    a) developing an image on a film with developer solution;
    b) delivering the developed film to a bleach solution;
    c) removing the film from the bleach solution after a visible image has been formed;
    d) electrically capturing the visual image for viewing;
    e) finishing processing of the film to form a negative; and
    f) selectively making a print of a film negative if its captured visual image is considered acceptable.

2. For use with a photographic film processor wherein film is sequentially delivered from a tank having a developer solution to a tank having a bleach solution and to a tank having a fixer solution, comprising:
    a) means for illuminating a film image after it is bleached but before being delivered to the fixer tank;
    b) means for electrically capturing and storing the illuminated bleached film image; and
    c) means for making prints of acceptable images.

3. The apparatus of claim 2 further comprising an image processor for correcting the color and density of the captured image.

* * * * *